United States Patent [19]

Hardwicke, III

[11] 4,312,148

[45] Jan. 26, 1982

[54] WEEDLESS FISHING LURE

[76] Inventor: James E. Hardwicke, III, 708 Arbutus Dr., Columbia, S.C. 29205

[21] Appl. No.: 150,914

[22] Filed: May 19, 1980

[51] Int. Cl.³ .............................................. A01K 85/00
[52] U.S. Cl. ................................ 43/42.24; 43/42.26; 43/42.1; 43/42.4; 43/42.43
[58] Field of Search .................. 43/42.24, 42.26, 42.1, 43/42.4, 42.41, 42.42, 42.43, 43.2, 43.4, 43.6

[56] References Cited

U.S. PATENT DOCUMENTS

| | | | |
|---|---|---|---|
| D. 230,976 | 3/1974 | Reynolds | 43/42.26 |
| D. 239,447 | 4/1976 | Radcliff | 43/42.26 |
| 1,313,567 | 8/1919 | Ulrich | 43/42.4 |
| 2,303,097 | 11/1942 | Townsend et al. | 43/42.26 |
| 2,316,048 | 4/1943 | Clarke | 43/42.24 |
| 2,820,314 | 1/1958 | Scott | 43/42.1 |
| 3,389,490 | 6/1968 | Peters et al. | 43/42.43 |
| 3,537,207 | 11/1970 | McClellan et al. | 43/42.43 |
| 3,670,445 | 6/1972 | Borger | 43/42.4 |
| 3,670,446 | 6/1972 | Wheeler | 43/43.4 |
| 3,750,321 | 8/1973 | McClellan | 43/42.1 |
| 3,978,606 | 9/1976 | Riggs | 43/42.24 |

FOREIGN PATENT DOCUMENTS

| | | | |
|---|---|---|---|
| 937342 | 8/1948 | France | 43/43.2 |
| 478773 | 3/1953 | Italy | 43/42.24 |
| 102405 | 6/1963 | Norway | 43/42.4 |
| 103704 | 2/1964 | Norway | 43/42.24 |

OTHER PUBLICATIONS

"Burke Chain Worm", Sporting Goods Dealer, Feb. 1968, p. 19.
"It's Super Chain Worm", Sporting Goods Dealer, Jan. 1969, p. 145.

Primary Examiner—James M. Meister
Assistant Examiner—J. T. Zatarga
Attorney, Agent, or Firm—Roylance, Abrams, Berdo & Farley

[57] ABSTRACT

Fishing lure bodies according to this invention comprise the combination of a main body composed of a soft, highly flexible, and resilient polymeric material, and at least a first, elongated appendage composed of a soft, highly flexible, resilient polymeric material having a low penetration resistance. The elongated appendage is coupled to the main body member in close proximity to the nose end thereof and has a thickness when relaxed and undistorted of between about 2 mm. and about 7 mm. The appendage has a length when relaxed and undistorted of at least about 2 cm. and is impaled axially by, and fully encloses the pointed end and barb of a hook. The combination of length, thickness and position of the coupling of the appendage to the main body together with softness, flexibility and low penetration resistance characteristics of the appendage are such that it functions as a weedguard. The bite of a fish causes the point and barb of the hook to penetrate outwardly through the appendage. The main body can be an elongated fishing lure body such as a plastic worm body.

19 Claims, 10 Drawing Figures

WEEDLESS FISHING LURE

BACKGROUND OF THE INVENTION

1. Field of the Invention

This invention provides an improved weedless artificial fishing lure of the type having an elastomeric body associated with at least one hook.

2. Description of the Prior Art

Artificial fishing lures having elastomeric bodies, particularly the so-called plastic worms, have been known and used since at least as early as the mid 1950's. The plastic worm type lures are the elastomeric body lures most frequently used, and usually comprise an elongated body designed to resemble a worm, snake, grub, minnow, or the like. The elongated body is composed of a soft, highly flexible and resilient polymeric material having a low penetration resistance. Typically, the polymeric material can be formed from a PVC plastisol, that is, a suspension of a PVC polymer in a liquid plasticizer. Generally, the plasticizer constitutes more than 50% of the plastisol composition and is responsible for the resiliency, flexibility, softness and low penetration resistance of the plastic worm body.

The plastic worm type lures are used extensively by bass fishermen especially large mouth bass fishermen. In fact, use of plastic worm lures by bass fishermen has increased to the extent that at the present time the plastic worm lures are the lures most frequently used by large mouth bass fishermen.

Plastic worm bodies are often sold separately from the hook or hooks for the lure. The fisherman may then choose his own hook and insert it into the worm body, as by forcing the pointed end of the hook into the nose of the worm body, sliding the hook axially through a portion of the body and passing the pointed end and barb of the hook radially outwardly through the body so that the pointed end of the hook is situated outside of the body and points in the direction of the nose of the lure. However, since many if not most fish are caught in the vicinity of lilly pads, submerged logs, brush, sunken rocks or like cover, the exposed hook end and partially exposed hook bight are prone to become snagged on underwater obstructions, resulting in loss of the lure.

In order to alleviate such problems, it has become a practice of fishermen who use plastic worms to turn the hook about its shank and reinsert the protruding pointed end and barb of the hook back into the body of the worm. Though this practice renders the plastic worm weedless, it also makes it more difficult to hook a fish. Upon feeling a strike the fisherman must jerk back on the line with sufficient force to cause the embedded hook to penetrate through both the plastic worm and the fish's mouth.

Hooks have been modified to render the lure weedless. Such modifications include providing special bends in the hook to make it more readily reinsertable back into the plastic body of the worm and/or cause it to penetrate more readily outwardly through the body of the worm at the time of a strike. However, such modification of the hook results in still another problem. The bend in the hook causes the shank and bight of the hook to protrude outside of the body of the plastic worm lure. Sometimes a large fish upon taking the worm into its mouth will immediately spit or blow the worm back out because the exposed part of the hook feels unnatural in the fish's mouth. Unless a fisherman is very quick he misses the strike.

Hooks have also been modified by the addition of a wire which is attached in the vicinity of the eye of the hook and bridges the gap between the eye and the end of the hook. The wire rests, under tension, on the pointed barb of the hook and will, in theory, prevent objects from becoming entangled in the bight of the hook. This type of weedguard suffers from the problems discussed above, i.e., unnatural feel and difficulty in setting the hook. Additionally, sometimes the tension holding the wire against the barbed point of the hook is too great and as a result the weedguard will not disengage from the hook during the strike by a fish with the result that the fish is not caught. If the tension on the wire is too low, the weedguard can pop loose upon encountering an underwater obstruction, causing the lure to be lost.

It has also been suggested in U.S. Pat. No. 3,389,490 to Peters et al to use one of the legs of a lure resembling a crayfish as a weedguard. The crayfish leg of Peters et al terminates in an enlargement into which the point of the hook, but not the barb, is inserted. The leg is made from a plastic material having sufficient stiffness and elasticity to cause the leg to spring off from the point of the hook in the event of a strike. Similarly, it has been suggested in U.S. Pat. No. 539,149 to Shattuck to render a hook weedless by the addition of a flexible arm attached to the shank of the hook and which is adapted to be bent down into engagement with the point of the hook. The material of which the guard is composed has a spring-like quality causing the end of the arm to remain in place behind the point of the hook due to tension, and to spring off upon being struck by a fish. These guards suffer similar disadvantages to the wire guards discussed above. If either the guard tension is too great, or if the guard is engaged too firmly by the hook, a fish cannot be hooked; if tension is too low or if engagement with the hook is too slight, the guards are readily disengaged by underwater obstructions.

Numerous other arrangements have been proposed to render both lures and hooks weedless but none have proven to be completely satisfactory for use with lures such as the plastic worm, having elastomeric bodies, and there has been a continuing need for improvement.

SUMMARY OF THE INVENTION

Fishing lure bodies according to the invention comprise the combination of a main body composed of a soft, highly flexible, and resilient polymeric material, and at least a first, elongated appendage composed of a soft, highly flexible, resilient polymeric material having a low penetration resistance. The elongated appendage is coupled to the main body member in close proximity to the nose end thereof and has a thickness when relaxed and undistorted of between about 2 mm. and about 7 mm. The appendage has a length when relaxed and undistorted of at least about 2 cm. and is adapted to be impaled axially by, and to fully enclose the pointed end and barb of a hook. The combination of length, thickness and position of the coupling of the appendage to the main body together with softness, flexibility and low penetration resistance characteristics of the appendage are such that it can be used as a weedguard. Advantageously, the main body is an elongated fishing lure body and more advantageously the main body is a plastic worm body. The appendage has a preferred thickness of between about 4 and 5 mm., and a preferred length of between about 3 and about 7 cm.

In another embodiment of this invention the combination fishing lure body further comprises a second appendage of like composition and structure, which is also coupled to the main body in close proximity to the nose end thereof. The combination may also include, if desired, a third, or a third and a fourth appendage of like composition and construction coupled to the main body member in close proximity to the nose end thereof. When the lure body comprises plural appendages, the appendages are advantageously coupled to the main body member in close circumferential spacing.

This invention also provides fishing lures comprising the combination of a main body composed of a soft, highly flexible, resilient polymeric material; a hook wherein the hook shank is situated concentrically within said main body and the point and barb of the hook are situated outside the main body with the pointed end pointing longitudinally in the general direction of the nose end of the main body; and at least a first, elongated appendage composed of a soft, highly flexible, resilient polymeric material material having a low penetration resistance which is coupled to the main body member in close proximity to the nose end thereof, and which has a thickness and length sufficient that the appendage may be impaled axially by and completely enclose the pointed end and barb of the hook. The length, thickness, position of coupling and composition of the appendage are accordingly such that the appendage can be used as a weedguard. Advantageous modifications to this aspect of the invention include the addition of at least a second appendage coupled to the main body member in close proximity to the nose end of the main body and close circumferential spacing of the plural appendages.

The weedless lure of this invention avoids the difficulties of prior art weedless lures for various reasons. The lure of the present invention is superior to weedless plastic worms wherein the worm body itself is used as the weedguard because less force is required to cause the point and barb of the hook to penetrate through the appendage provided by this invention than is required to cause the point and barb of the hook to penetrate through the body of the plastic worm itself. Additionally, no specially modified hooks need be used with the lure body of this invention. The appendage of the present invention can be impaled over the point, barb and bight of the hook to such an extent that there is substantially no exposed metal surface and accordingly a fish is less likely to blow out the lure because of unnatural mouth feel. The appendage, which is impaled axially onto the pointed end and barb of the hook is securely held in place and not readily dislodged by underwater obstructions; however, slight lateral pressure resulting from the bite of a fish causes the pointed end and barb of the hook to penetrate out of the appendage. When the artificial lure of the present invention is provided so as to have plural appendages, it may be reused in a weedless fashion even though one of the weedguard appendages has been destroyed by a strike.

BRIEF DESCRIPTION OF THE DRAWINGS

In the drawings which form part of the original disclosure of this application.

DETAILED DESCRIPTION OF THE INVENTION

Figure 1:
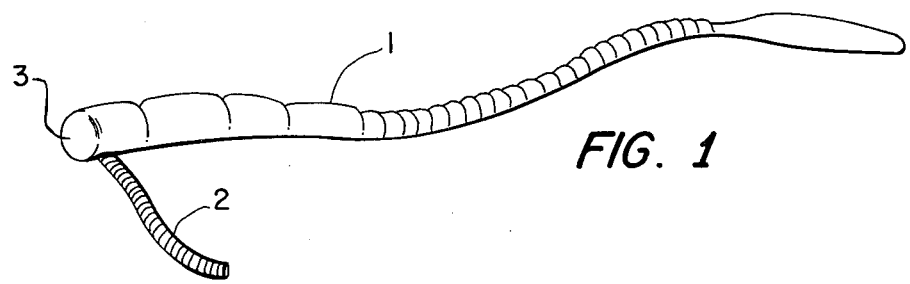
FIG. 1 is a side elevational view of a plastic worm body according to one embodiment of the invention.

A weedless artificial lure body of this invention is shown in FIG. 1 and comprises a main body 1 composed of a soft, highly flexible, resilient polymeric material. Such a polymeric material will typically be a highly plasticized polymer, i.e., a plastisol, which is composed of a polymeric resin such as a polymer or copolymer of vinyl chloride, suspended in a suitable plasticizer such as dioctyl phthalate, dibutyl phthalate, diethylhexyl adipate, tricresyl phosphate, or the like. The plasticizer typically comprises greater than 50 percent by weight of the plastisol mixture, and will often comprise between about 66% by weight to about 75% by weight of the mixture. A resin which is not plasticized, but which inherently has the characteristics of being soft, highly flexible and resilient and has a low penetration resistance, such as for example, a silicone resin, may also be used. However, the highly plasticized polymers, especially highly plasticized PVC, are well accepted in the art and are preferred for use in the present invention.

Advantageously, the main body member is an elongated body and is of the "plastic worm" type, that is, an elongated body resembling, more or less, a creature having no appendages, i.e., a worm, snake, minnow, grub, etc. Elongated body members may also be designed so as to resemble, more or less, a creatures having appendages, i.e., salamanders, crawfish, centipedes or the like.

The lure body of the invention also comprises at least one elongated appendage 2 which is coupled to the main body member 1 in close proximity to the nose end 3 of the main body member. The appendage 2 is also composed of a soft, highly flexible, resilient polymeric material which has a low penetration resistance. Such materials are as discussed previously with respect to the main body. Advantageously the appendage is formed integrally with the main body member and is composed of the same material as the main body member. However, if desired, the appendage can be formed separately from the main body member and thereafter coupled to the same. Where the body member is an elongated body which is not of the plastic worm type, i.e., resembles more or less a creature having appendages, appendage 2 is provided in addition to the appendages which are part of the body member and which resemble, more or less, those of the creature.

Figure 2:
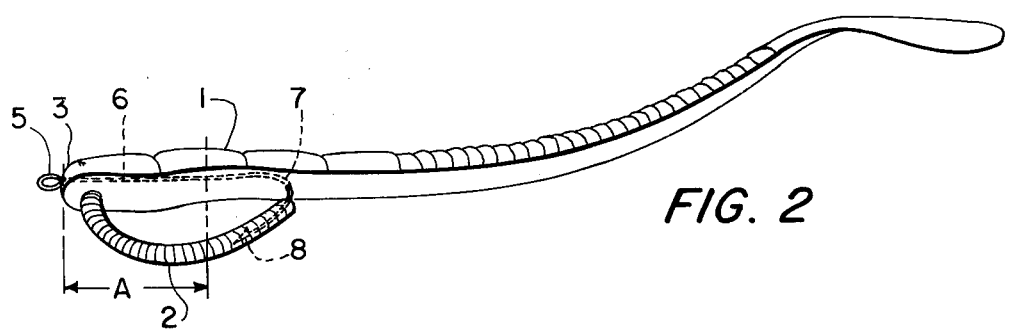
FIG. 2 is a side elevational view of the lure body of FIG. 1 equipped with a hook and rendered weedless according to the invention, the lure being shown turned about its longitudinal axis to expose the belly of the lure.

The combination of the weedless artificial lure body of FIG. 1 with a hook, wherein the appendage is disposed upon the hook thereby rendering the combination lure body and hook weedless is illustrated in FIG. 2. The combination lure shown in FIG. 2 includes main elongated body member 1, a hook, and appendage 2 coupled to the main body member in close proximity to its nose end 3. Hook eye 5 is situated at or near the outer surface of nose end 3 of the main body and the hook shank 6 is situated concentrically within the main body. A portion of the hook bight 7 is situated within the main body member and a portion of the bight is situated outside of the body member. The pointed end and barb 8 of the hook are situated outside of the main body and point longitudinally in the general direction of the nose end of the main body. As shown, the appendage is impaled axially by and completely encloses the pointed end and barb of the hook.

In FIG. 2, the linear portion of the nose end of the main body to which the appendage must be coupled in order to function as a weedguard is shown by line A. Thus, the appendage must be coupled at a point forwardly, in the direction of the nose end, from the point on the main body corresponding laterally to the termination of the pointed end of the hook.

In practice, the lure body of the present invention will often by sold without a hook leaving the choice of hook up to the consumer, i.e., the fisherman, and it is preferred that the appendage be coupled to the main body member in such close proximity to its nose end that any of numerous sizes of hooks may be used with the lure. Accordingly, the appendage is preferably coupled between the nose end and the lateral point on the main body corresponding to the termination of the pointed end of the smallest hook which would be used with the worm as illustrated by line A wherein the hook shown represents the smallest hook which would be normally used with the particular elongated body.

The appendage is advantageously coupled to the main body member at a distance of no more than 20 mm., preferably, within no more than 13 mm. from the nose end thereof. Preferably, the appendage will be coupled to the main body member at a length of between about 5 and about 10 mm. from the nose end of the main body member. Generally, for shorter main elongated body members, i.e., small worms and grubs which are intended for use with smaller hooks, the appendage will need be coupled to the main body member within a closer distance to the nose end as compared with longer main body members, which are normally used with larger hooks.

The thickness of the appendage should be sufficient to completely enclose the barb of different sized hooks. The maximum barb diameter which will normally be used with a lure of the plastic worm type is about 2 mm. Therefore, the appendage should have a minimum lateral thickness of greater than 2 mm., preferably greater than about 3 mm. However, the thickness should not be so great as to provide a large amount of resistance to penetration by the pointed end and barb of a hook. When a fish strikes the hook-lure-body combination such as shown in FIG. 2, it is important that the pointed end and barb of the hook penetrate outwardly through the appendages under slight pressure. Therefore, the appendage should have a thickness of no greater than about 7 mm., preferably a thickness of less than about 6 mm. More preferably, the appendage should have a thickness of on the average about 4 to 5 mm., which often will correspond to a thickness of slightly less than about one-half the thickness of the main body member in the vicinity of the nose end thereof. An appendage having a thickness of about 4 to 5 mm. is of adequate thickness to easily enclose the barb of even the largest hook that is normally used with plastic worm type lures and at the same time is not so thick so as to provide a great resistance to outward penetration of the pointed end and barb of the hook through the appendage.

The length of the appendage is similarly designed so that it can be used with both large, and thus long, and small, and thus short, hooks. The appendage is therefore advantageously of sufficient length to be used with a large hook. Where the appendage is overly long for the hook chosen by the fisherman, the fisherman can simply break off and discard the excess length of the appendage. Similarly, the appendage preferably has a length when relaxed and undistorted sufficiently long to cover at least a portion of the bight of the hook as shown in FIG. 2. More preferably, the appendage has a length sufficient to cover all of the exposed bight of the hook. When at least a portion of, or all of the bight of the hook is covered the problem of unnatural mouth feel is minimized or eliminated. For smaller lures intended to be used with small hooks, an appendage length of as short as 20 mm. may be sufficient. However, preferably the appendage will have a length of between about 3 cm. and about 7 cm. and more preferably will have a length of between about 4 and about 5 cm.

Figure 3:
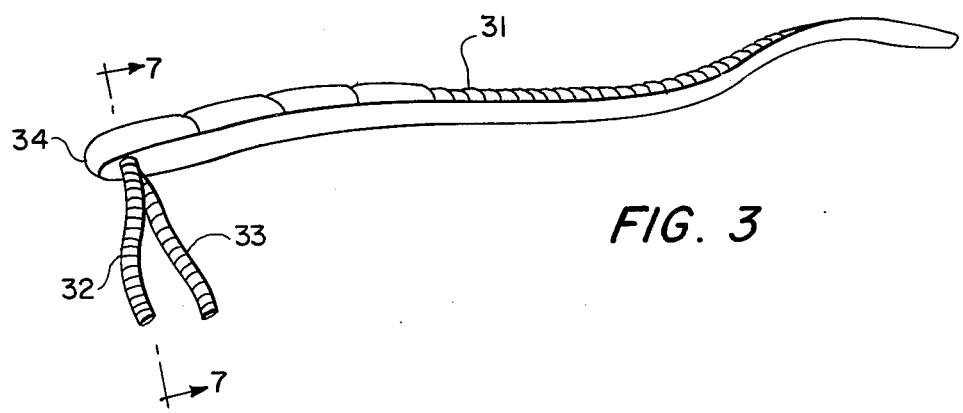
FIG. 3 is a perspective view of a plastic worm body according to another embodiment.
Figure 4:
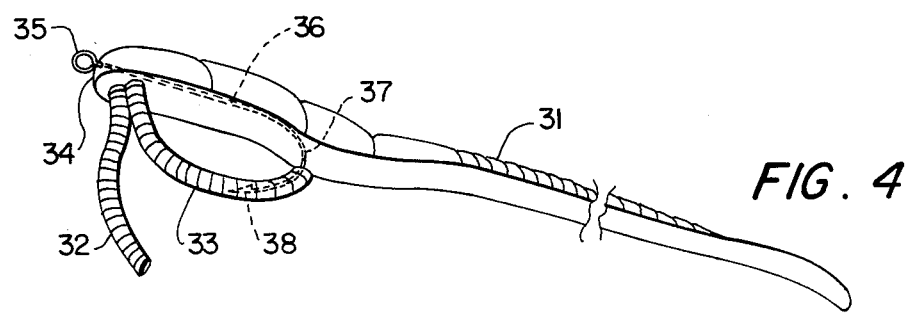
FIG. 4 is a perspective view of the lure body of FIG. 3 equipped with a hook and rendered weedless according to the invention.

A preferred embodiment of this invention is shown in FIGS. 3 and 4. In FIG. 3 is shown a weedless artificial lure-body comprising main body member 31 and further comprising appendages 32 and 33 which are coupled to the main body member in close proximity to the nose end 34.

The combination of FIG. 3 which further comprises a hook is shown in FIG. 4. Thus, the combination in FIG. 4 comprises a main body member 31, a hook and first and second appendages 32 and 33 which are coupled to the main body member in close proximity to the nose end 34. Hook eye 35 is situated at the outer surface of the nose end 34 with the hook shank 36 being situated concentrically within the main body member. The bight 37 of the hook is partially situated inside of the main body and partially outside of the main body. The pointed end and barb 38 of the hook are situated outside of the main body member and point longitudinally in the general direction of the nose end of the main body. Appendage 33 is shown to be impaled by and to completely enclose the pointed end and barb 38 of the hook such that the pointed end and barb are spaced forwardly from the trailing end of the appendage.

The provision of two appendages such as shown in FIGS. 3 and 4 is an advantageous embodiment of this invention since it is likely that after a strike or a catch, the appendage which was functioning as a weedguard, appendage 33 in FIG. 4, will be at least partially destroyed and thus unusable. At that point, appendage 33 may simply be broken off by the fisherman and appendage 32 may be used as the weedguard. In the prior art use of the worm body, itself, as a weedguard the entire lure was often destroyed upon the first strike or catch due to penetration of the barb and pointed end of the hook outwardly through the main body. By using the embodiment of this invention shown in FIGS. 3 and 4, the lure can continue to be used in a weedless fashion even though the first weedguard appendage has been destroyed. The preferred length, thickness and coupling position of each appendage, 32 and 33, is as discussed with respect to appendage 2 of FIGS. 1 and 2.

Figure 5:
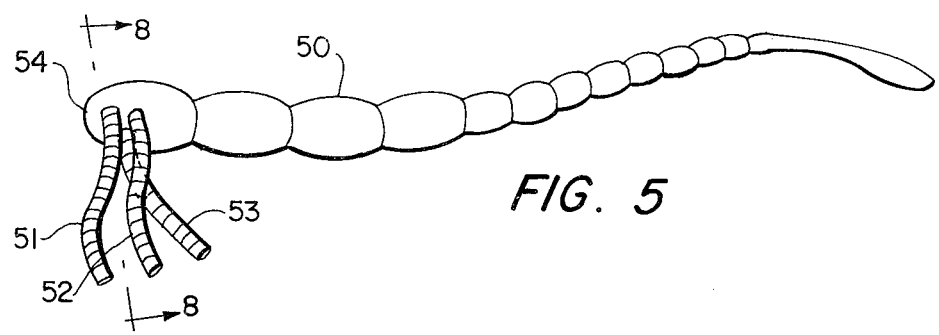
FIGS. 5 and 6 are perspective views of plastic worm bodies according to the invention.
Figure 6:
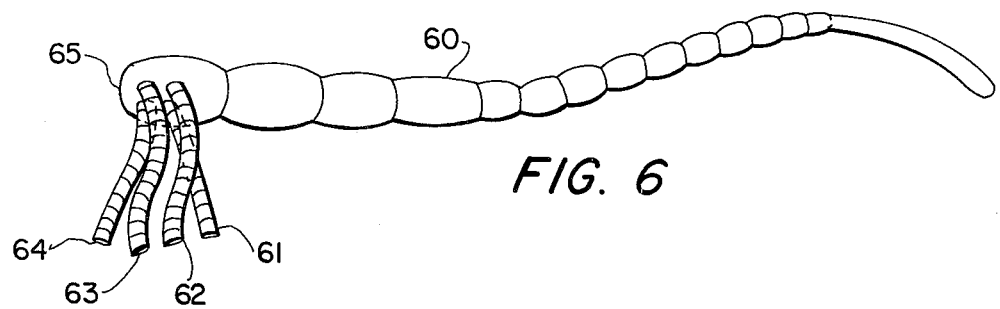

FIGS. 5 and 6 illustrate embodiments of the invention wherein three and four weedguard appendages are provided, respectively. In FIG. 5 the weedless artificial lure-body combination comprises main body 50 with appendages 51, 52 and 53 being coupled to the main body in close proximity to the nose end 54. The combination shown in FIG. 6 comprises main body 60 with appendages 61, 62, 63 and 64 being coupled to the main body member and in close proximity to the nose end 65. The preferred length, thickness, and coupling position of the appendages shown in FIGS. 5 and 6 are the same as discussed with respect to the embodiments shown in FIGS. 1-4.

Advantageously, the plural appendages in any embodiment of the invention should be joined to the body member in close circumferential spacing. Preferably the appendages are coupled to the main body member such that the circumferential spacing of the most circumferentially distant edges of the appendages is less than about 180° C., as seen in FIGS. 7 and 8.

Figure 7:
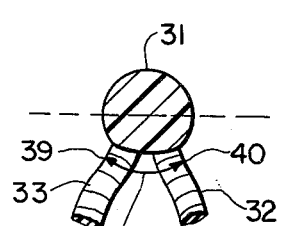
FIG. 7 is a longitudinal cross section of the plastic worm body of FIG. 3 taken along line 7—7.

FIG. 7 is a cross-sectional view of the lure body of FIG. 3 taken along line 7—7. Edges 39 and 40 of appendages 33 and 32, respectively, are the most circumferentially distant edges of appendages 33 and 32. Angle B which is the angle formed by edges 39 and 40 is shown to be less than 180° C. In a preferred embodiment, when more than one appendage is provided in the combination lure, the circumferential spacing of the two most circumferentially distant edges of the appendages should be less than about 120° C.

Figure 8:
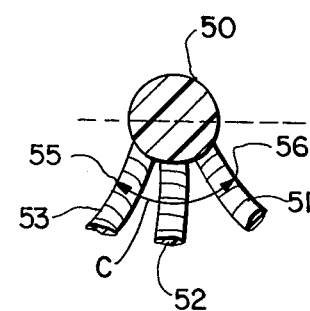
FIG. 8 is a longitudinal cross section of the plastic worm body of FIG. 5 taken along line 8—8.

FIG. 8 is a cross-sectional view of the lure body of FIG. 5 taken along line 8—8. Edges 55 and 56 of the appendages 53 and 51, respectively, are the most circumferentially distant edges of the plural appendages, 51, 52 and 53. Angle C, formed by edges 55 and 56 is shown to be less than 180° C. Preferably, as previously indicated, angle C is less than about 120° C.

The provision of plural appendages in close circumferential spacing can minimize the problems associated with the phenomenon of line twist. If the position at which an appendage is coupled to the main body member is at a circumferentially distant point from the point where the hook bight exits the main body, then the appendage will need be twisted around the main body in order to be impaled upon the hook. This twist of the appendage can cause the lure to spin as it is pulled through the water by the fisherman, resulting in twisting of the fishing line which can ultimately result in tangling of the fishing line. By providing the plural appendages with close circumferential spacing as shown in FIGS. 7 and 8 a hook can be inserted into the main body in a manner such that the point where the bight exits the main body is between or among the appendages and is circumferentially close to each appendage. Accordingly, each of the appendages can be joined to the hook when appropriate such that each appendage when impaled on the hook stays generally longitudinally parallel to the main body member.

Figure 9:
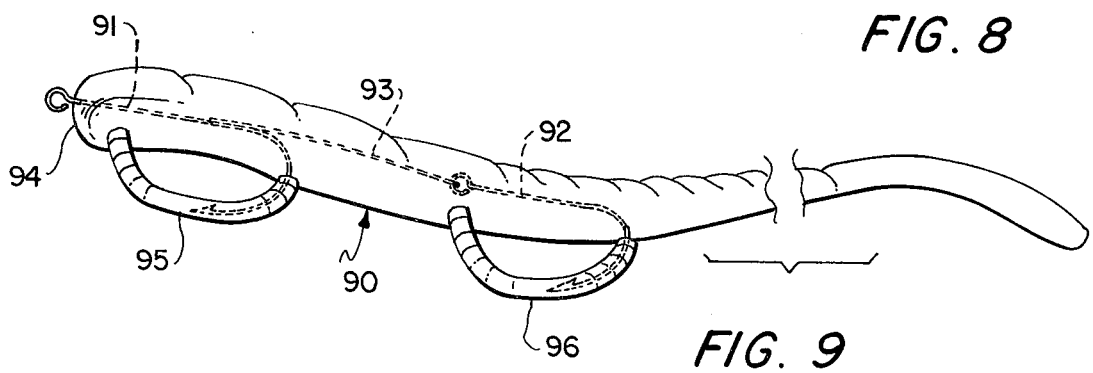
FIG. 9 is a side elevational view of a plastic worm body equipped with two hooks and rendered weedless according to the invention.

In FIG. 9 is shown an embodiment of the present invention wherein the combination lure comprises two longitudinally spaced hooks. The combination shown in FIG. 9 comprises main elongated body member 90 composed of a polymeric composition as previously described and hooks 91 and 92 which are joined by a line, e.g., a monofilament, wire, cord or the equivalent 93. If desired line 93 may be situated outside of the main body in a conventional manner (not shown). Hook 91 is situated at the nose end 94 of the main body such that the shank of hook 91 is concentrically within the main body and the pointed end and barb of hook 91 are outside the main body. The pointed end of hook 91 points longitudinally in the direction of the nose end 94 of the main body. Hook 92 is situated longitudinally rearwardly of hook 91 with the shank of hook 92 being enclosed by the main body. The pointed end and barb of hook 92 are situated outside the main body and the pointed end of hook 92 points longitudinally in the direction of nose end 94. The combination includes appendage 95, coupled to the main body member 90 in close proximity to its nose end 94. The length and thickness of appendage 95 are sufficient that appendage 95 may be impaled over and fully enclose the pointed end and barb of hook 91, as shown. Appendage 95 is composed of the polymeric composition previously described. The preferred length, thickness, coupling and composition of appendage 95 are as previously discussed with respect to other embodiments.

The combination lure shown in FIG. 9 additionally includes appendage 96 which is coupled to main body member 90 at a position in close longitudinal proximity to the eye of hook 92. The length and thickness of appendage 96 are sufficient that appendage 96 can be impaled by and fully enclose the pointed end and barb of hook 92. Appendage 96 is composed of the polymeric material previously described. The length, thickness, coupling and composition of appendage 96 are such that it may be used as a weedguard for hook 92 as shown.

The combination shown in FIG. 9 may comprise additional appendages of like construction and composition coupled in close proximity to nose end 94 of main body 90 and/or coupled in close longitudinal proximity to the eye of hook 92.

Figure 10:
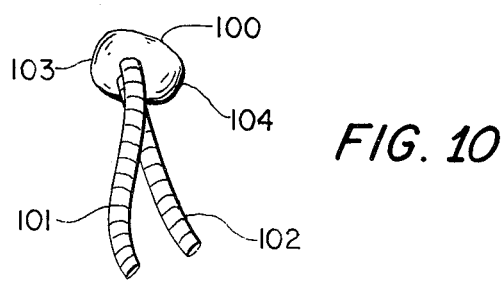
FIG. 10 is a perspective view of a lure body according to a further embodiment of the present invention.

FIG. 10 is a perspective view of a lure body according to another aspect of this invention. Main body 100 is composed of a soft, highly flexible and resilient polymeric material. Two appendages, 101 and 102, which are each composed of a soft, highly flexible and resilient polymeric material having a low penetration resistance are coupled to the main body in close proximity to an end 103 thereof which thereby constitutes the nose end.

The lure body illustrated in FIG. 10 is to be used in combination with a hook and, advantageously, further in combination with a conventional elongated elastomeric lure body such as a plastic worm by forcing the hook into nose 103 and axially through main body 100 which is then slid upward on the hook shank until nose end 103 is at or near the eye of the hook. Following such positioning of the lure body of FIG. 10 on the hook shank, the conventional plastic worm body is mounted on the hook in the conventional manner so that the nose end of the conventional plastic worm body is in contact with the rear end 104 of the lure body of FIG. 10. Appendages 101 and 102 may then be used to render the hook point and barb which protrude from the conventional worm body, weedless. FIG. 10 illustrates the use of two appendages in the combination; however, the combination lure body shown in FIG. 10 may only include a single appendage, or several appendages as discussed with respect to FIGS. 1-8. The preferred length, thickness and coupling position of the appendage or appendages are as discussed with respect to FIGS. 1-8.

Although the invention has been described in considerable detail with particular reference to certain preferred embodiments thereof, variations and modifications can be effected within the spirit and scope of the invention as described hereinbefore, and as defined in the appended claims .

What is claimed is:

1. In an artificial fishing lure the combination comprising
   (A) a main body composed of a soft, highly flexible, resilient polymeric material, said main body having a nose end; and
   (B) at least a first elongated weedguard appendage composed of a soft, highly flexible, resilient polymeric material having a low penetration resistance, said appendage being coupled to said main body in close proximity to the nose end thereof, said appendage having a thickness when relaxed and undistorted of between 2 and about 7 mm., said appendage having a length when relaxed and undistorted of greater than 2 cm.,
   (C) a hook consisting of an eye, a shank, a bight and terminating in a pointed end and barb, said hook being coupled to said body such that said pointed end and barb of said hook are situated outside of said main body with said pointed end pointing longitudinally in the general direction of said nose end of said main body,
   said first weedguard appendage being axially impaled by and completely enclosing said barb and pointed end of said hook such that the trailing end of said weedguard appendage extends rearwardly past the barb which thereby restrains said weedguard appendage so that the bite of a fish causes said pointed end and said barb of said hook to penetrate outwardly through said weedguard appendage.

2. The combination of claim 1, wherein said main body is an elongated body.

3. The combination defined in claim 2, wherein said appendage has a thickness of between about 3 and about 6 mm. and a length of greater than about 3 cm.

4. The combination defined in claim 3, wherein said appendage has a thickness of between about 4 and about 5 mm. and a length of less than about 7 cm.

5. The combination defined in claim 3, wherein said appendage is coupled to the main body within a distance of about 2 cm. from the nose end thereof.

6. The combination of claim 5, wherein said appendage is coupled to said main body within a distance of about 1 cm. from the nose end thereof.

7. The combination defined in claim 6, wherein said main body is of the plastic worm type.

8. The combination defined in claim 2, further comprising a second appendage of composition, construction and coupling position as defined in claim 1.

9. The combination defined in claim 8, wherein said first and said second weedguard appendages are coupled to said main body member such that the circumferential spacing of the two most circumferentially distant edges of said appendages is less than about 180° C.

10. The combination defined in claim 9, wherein each of said appendages has a thickness of between about 3 and about 6 mm. and a length of greater than about 3 cm.

11. The combination defined in claim 10, wherein each of said appendages has a length of less than about 7 cm. and a thickness of between about 4 and about 5 mm.

12. The combination defined in claim 11, wherein said appendages are coupled to said main body within a distance of 1 cm. from the nose end thereof.

13. The combination of claim 12, wherein said circumferential spacing is less than about 120°.

14. The combination defined in claim 8, further comprising a third weedguard appendage of composition, construction and coupling position as defined in claim 1.

15. The combination of claim 14, wherein each of said appendages has a thickness of between about 3 and about 6 mm. and a length of less than about 7 cm.

16. The combination defined in claim 15, wherein said first, second and third appendages are coupled to said main body member such that the circumferential spacing of the two most circumferentially distant edges of said first, second and third appendages is less than about 180°.

17. The combination defined in claim 15, further comprising a fourth weedguard appendage of composition, construction and coupling position as defined in claim 1.

18. The combination defined in claim 17, wherein said first, second, third and fourth appendages are coupled to said main body such that the two most circumferentially distant edges of said first, second, third and fourth appendages is less than about 180°.

19. The combination defined in claim 2, further comprising
   a second hook consisting of an eye, a shank, a bight and terminating in a pointed end and barb
   the shank of said second hook being enclosed by a longitudinally rearward portion of said main elongated body
   the pointed end and barb of said second hook being situated outside of said main body with the pointed end of said hook pointing longitudinally in the general direction of said nose end of said main body
   said second and the first hook being connected by a line,
   the combination further comprising at least a second weedguard appendage composed of a soft, highly flexible and resilient polymeric material having a low penetration resistance,
   said second weedguard appendage being coupled to said main body in close longitudinal proximity to the eye of said second hook
   said second weedguard appendage being axially impaled by and completely enclosing said pointed end and barb of said second hook such that the trailing end of said second weedguard appendage extends rearwardly past said barb of said second hook so that the bite of a fish causes said pointed end and said barb of said second hook to penetrate outwardly through said second weedguard appendage.

* * * * *

UNITED STATES PATENT AND TRADEMARK OFFICE
CERTIFICATE OF CORRECTION

PATENT NO. : 4,312,148
DATED : January 26, 1982
INVENTOR(S) : James E. Hardwicke, III It is certified that error appears in the above-identified patent and that said Letters Patent are hereby corrected as shown below:

Column 5, line 27, correct "by" to --be--

Column 7, line 22, delete "C."
        line 28, delete "C"
        line 32, delete "C"
        line 38, delete "C."
        line 39, delete "C"

Column 9, line 59, delete "C"

Signed and Sealed this

Sixth Day of April 1982

[SEAL]

Attest:

GERALD J. MOSSINGHOFF

Attesting Officer     Commissioner of Patents and Trademarks